Figure 1:
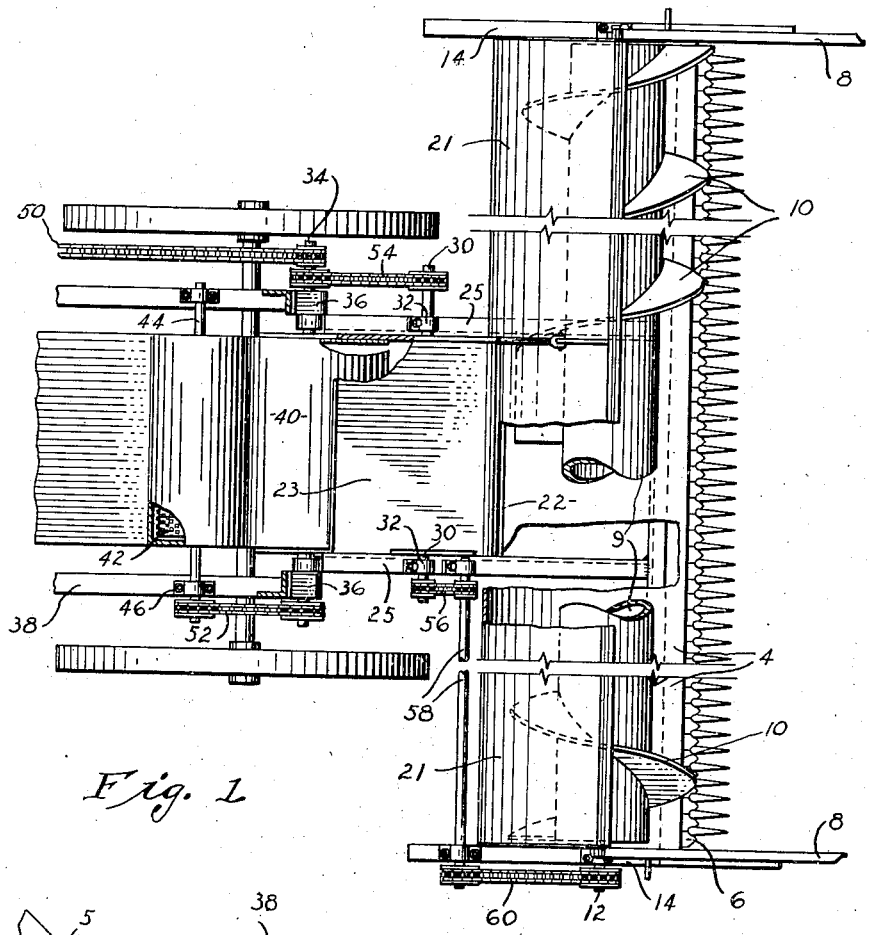

May 3, 1949.

K. O. PETERSON 2,469,241

ADJUSTABLE CUTTER AND FEEDER
ASSEMBLY FOR HARVESTERS
Filed Sept. 25, 1946

INVENTOR:
K. O. Peterson,
BY Chas. K. Gerard,
ATTORNEY

Patented May 3, 1949

2,469,241

UNITED STATES PATENT OFFICE 2,469,241

ADJUSTABLE CUTTER AND FEEDER ASSEMBLY FOR HARVESTERS

Karl O. Peterson, Kansas City, Mo., assignor of one-half to Vaughn H. Doyle, Leonardville, Kans.

Application September 25, 1946, Serial No. 699,160

3 Claims. (Cl. 56—20)

The present invention relates to harvesting machinery, and particularly to the type of harvesters known as combined harvester equipment, and a primary object of the invention is to devise improvements in the method of supporting and adjusting the unit or assembly of the equipment carrying the cutting and grain feeding mechanism.

Accordingly, an important object of the invention is to devise apparatus of the character described in which the carrying framework supporting the grain cutting mechanism and principal elements and connections for conveying the cut grain to the thresher and separator units is appropriately mounted for accommodating all the proper functions thereof and at the same time is rendered conveniently adjustable for pivotal shifting movement vertically, without affecting the operation of any of the drive connections to said equipment.

More specifically, I provide a vertically adjustable unit of the character stated in which the shaft of one of the cylinder elements thereof serves also as the countershaft for the drive connections from the motor which operates the cutting mechanism and the other parts of the assembly.

With the foregoing general objects in view, the invention will now be described by reference to the accompanying drawing illustrating one form of construction which I have devised for the embodiment of the proposed improvements, after which those features and combinations deemed to be novel and patentable will be particularly set forth and claimed.

In the drawing—

Figure 2:
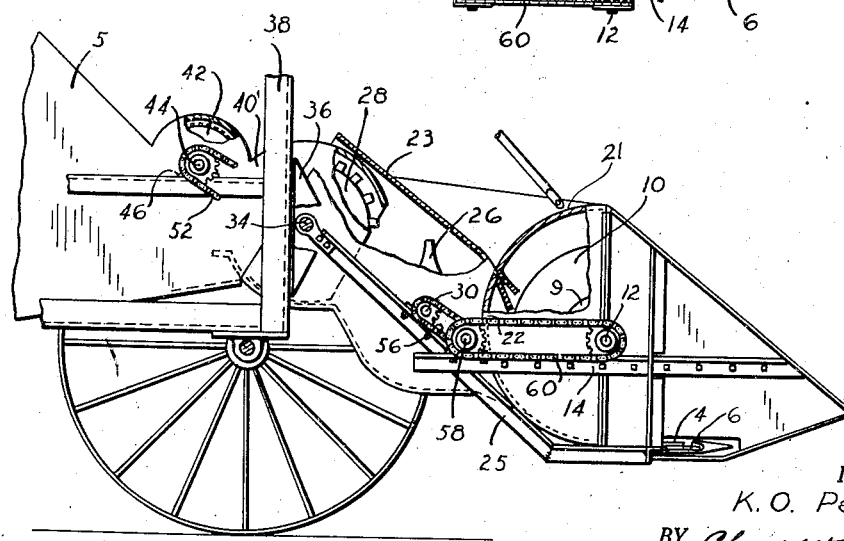

Figure 1 is a plan view, with portions indicated as broken away, illustrating a harvester construction embodying the present features of improvement; and Figure 2 is a side elevation of the same, also having certain parts of the framework and casing portions represented as broken away.

Referring now to the accompanying drawing detail, the improved construction is illustrated as comprising grain cutting mechanism and grain conveying or feeding means provided with feed connections and operating means therefor which are arranged for adjusting or raising and lowering movement, with reference to the front end of the casing 5 constituting part of the separator unit of the apparatus.

The grain cutting and auger feeding means forming part of the construction is in general similar to that set forth in my copending application Serial No. 699,159, filed concurrently herewith. This part of the apparatus comprises a sickle bar structure 6 and grain divider members 8 supported by the grain platform 4, and auger conveyor having spiral conveyor flights 10 carried by a hollow cylindrical auger shaft 9 having trunnions 12 mounted in and supported by suitable framework 14 at the opposite ends of said grain platform 4.

The auger conveyor is partly enclosed by a casing or housing 21, the middle portion of which is provided with an outlet 22 for the cut grain, and through which the grain discharges into a casing structure 23. This casing or housing structure 23 is carried by the framework 25 which also supports the grain platform 4, and houses a conventional type of feeder beater member comprising a plurality of blades 26 and also a main thresher cylinder 28, the beater member being carried by a shaft 30 journaled in bearings 32 on said framework 25, and the cylinder 28 being carried by a shaft 34 journaled in fixed brackets 36 in the main framework 38 carrying the separator casing 5. An important feature of this invention is the mounting of the ends of the rearwardly extending arms of the framework 25 upon the ends of the shaft 34, whereby said framework and the various elements supported thereby comprise an assembly which is pivotally movable about the ends of the shaft 34 which forms the axis of said thresher cylinder 28.

The forward portion of the main casing 5 is formed with a housing extension 40 adapted to cooperate with the rear portion of the casing 23 for completely enclosing the cylinder 28, while also permitting any vertical pivotal movement of the latter casing 23 in response to the adjustments of the framework 25, as will be readily understood.

As is usual in equipment of this character, a feeder beater cylinder 42 is mounted on a shaft 44 journaled in brackets 46 on the frame 38 and just to the rear of the aforementioned cylinder 28.

In prior constructions it has been the practice to provide an indirect drive through a countershaft to the thresher cylinder, and to introduce drive connections from this unit to the remaining elements of the assembly. In the present case, I provide a drive chain or belt 50 direct to the shaft 34 of the cylinder 28, from which in turn a drive chain 52 is arranged for operating the shaft 44 of the feeder beater cylinder 42. From said shaft 34 also the usual drive connections are made, consisting of a drive chain 54 to the shaft 30 of the feeder beater member 26, which in turn is provided with a drive connection 56 to a countershaft 58 from which a drive chain or belt 60 is arranged to provide the necessary drive to the grain auger, as shown. Any conventional form of drive (not shown) may of course be used for driving the grain cutting mechanism.

From the foregoing it will be apparent that I have devised a practical construction for carrying out the desired objects of the invention as aforesaid. All the necessary adjustments of the position of the assembly comprising the grain cutting and feeding elements may be made without affecting the drive to said operating elements, in view of the drive thereto being connected with the axis of adjustment, as represented by the shaft 34 of the cylinder 28; and this is accomplished without affecting the drive to the feeder beater cylinder 42, by transmitting the drive thereto through the same shaft 34, as to the other mechanism referred to. Moreover, all these operating movements and adjustments may thus be taken care of without any disturbance of the handling and the feeding of the cut grain, which follows its usual course from the cutting mechanism to the threshing cylinder and separator unit, as in the usual apparatus.

While I have illustrated and described what I have found to constitute a satisfactory and efficient arrangement and construction for embodying my proposed improvements, I desire to reserve the right to make such changes or modifications as may fairly fall within the scope of the appended claims.

Having thus described my invention, what I claim is:

1. A harvester apparatus comprising, in combination, grain cutting and feeding mechanism, thresher mechanism including a thresher cylinder in receiving relation to said feeding mechanism, and means for supporting said grain cutting and feeding mechanism for pivotal raising and lowering movement about the axis of said cylinder.

2. A harvester apparatus comprising, in combination, grain cutting means and grain feeding means, thresher mechanism including a thresher cylinder in receiving relation to said grain feeding means, a rotary feeder beater member intermediate said cylinder and feeding means, and framework supporting said grain cutting and feeding means and also journaling said feeder beater member, said framework being mounted for pivotal movement about the axis of said thresher cylinder.

3. A harvester apparatus comprising, in combination, grain cutting and grain feeding means including a rotary feeder beater member, thresher mechanism including a thresher cylinder in receiving relation to said feeder beater member, means for driving said thresher cylinder, framework supporting said cutting and feeding means and also journaling said feeder beater member, said framework being mounted for pivotal movement about the axis of said thresher cylinder, and driving means actuated by operation of said thresher cylinder for driving said grain cutting and feeding means.

KARL O. PETERSON.

REFERENCES CITED

The following references are of record in the file of this patent:

UNITED STATES PATENTS

| Number | Name | Date |
| --- | --- | --- |
| 2,112,922 | Millard | Apr. 5, 1938 |
| 2,161,634 | Pierson | June 6, 1939 |
| 2,354,346 | MacGregor | July 25, 1944 |